United States Patent
Wuthrich

[15] 3,670,493
[45] June 20, 1972

[54] INDEXING MECHANISM FOR ELECTRIC/ELECTRONIC TIMEPIECES

[72] Inventor: Paul Wuthrich, Woodbury, Conn.
[73] Assignee: Timex Corporation, Waterbury, Conn.
[22] Filed: March 27, 1970
[21] Appl. No.: 23,145

[52] U.S. Cl. ........................58/116, 58/28 D, 74/1.5
[51] Int. Cl. ..........................G04b 15/00, G04c 3/04
[58] Field of Search ............58/28, 28 D, 116, 117, 121; 74/1.5

[56] References Cited

UNITED STATES PATENTS

| | | | |
|---|---|---|---|
| 2,954,662 | 10/1960 | Detwiler | 58/28 D |
| 3,446,007 | 5/1969 | Cohen | 58/116 |
| 3,505,805 | 4/1970 | Cohen et al. | 58/28 |
| 3,059,500 | 10/1962 | Schneiter | 58/28 D |

Primary Examiner—Stephen J. Tomsky
Assistant Examiner—E. Simmons Jackmon
Attorney—Richard A. Joel

[57] ABSTRACT

A horological instrument such as a watch includes an indexing mechanism or dial train drive for transmitting power from an oscillating balance wheel to an index wheel. The index wheel drives the gear train of a watch. The balance wheel oscillates a lever between two end positions and one or more pins mounted on the lever step the index wheel in a predetermined direction under the influence of a drag spring. Detenting of the index wheel is accomplished by the drag spring which engages the multi-toothed drag disk mounted on the index wheel.

4 Claims, 2 Drawing Figures

PATENTED JUN 20 1972

3,670,493

INVENTOR.
PAUL WUTHRICH

BY Richard H. Joel
ATTORNEY

INDEXING MECHANISM FOR ELECTRIC/ELECTRONIC TIMEPIECES

BACKGROUND OF THE INVENTION

The present invention relates to horology and more particularly to an indexing arrangement for watches.

The prior art includes U.S. Pat. No. 3,462,942 to Josef Egger and Heinz Meitinger which discloses a now common dial train drive. An oscillating balance wheel drives a lever to and fro in order to step an index wheel. A magnet is provided for each step of circular pitch of the index wheel so that a direct or indirect magnetic influence holds the lever as well as the index wheel. Meitinger U.S. Pat. No. 3,298,170 and 3,396,531 are also of interest in this area.

Another patent representative of the prior art is U.S. Pat. No. 3,122,879 to K. Trick, et al. This patent discloses a driving mechanism for electrically driven rotary oscillators in which the lever or fork is held in its extreme positions and in which the jumping or slipping of the stepping wheel is reliably prevented by means of a safety cam.

SUMMARY OF THE INVENTION

The present invention pertains to an indexing mechanism for electric or electronic timepieces wherein the balance wheel assembly drives an index lever causing oscillation thereof. A pair of spaced apart index pins are mounted on the index lever to alternately engage the teeth of an index wheel advancing each tooth by one-half pitch.

A ferro-magnetic draw lever attached to the index lever interacts with an indexing magnet mounted on the plate to hold the draw lever in extreme positions against the banking pins. In contrast to the conventional arrangements of prior art, the indexing magnet does not act on the index wheel. Detenting of the index wheel is accomplished by a one-direction drag spring which is fastened to the frame and which has its free end in contact with the teeth of a drag disk. The drag disk has a large plurality of teeth positioned about its periphery to permit proper detenting of the index wheel regardless of drag spring length or tolerances due to pitch errors.

It is an object of this invention to provide a new and improved indexing mechanism for timepieces.

It is another object of this invention to provide a unique indexing mechanism for timepieces wherein detenting of the index wheel is accomplished by a unique drag spring arrangement.

Other objects and advantages of the present invention will be more clearly seen when viewed in conjunction with the accompanying drawings wherein.

Figure 1:
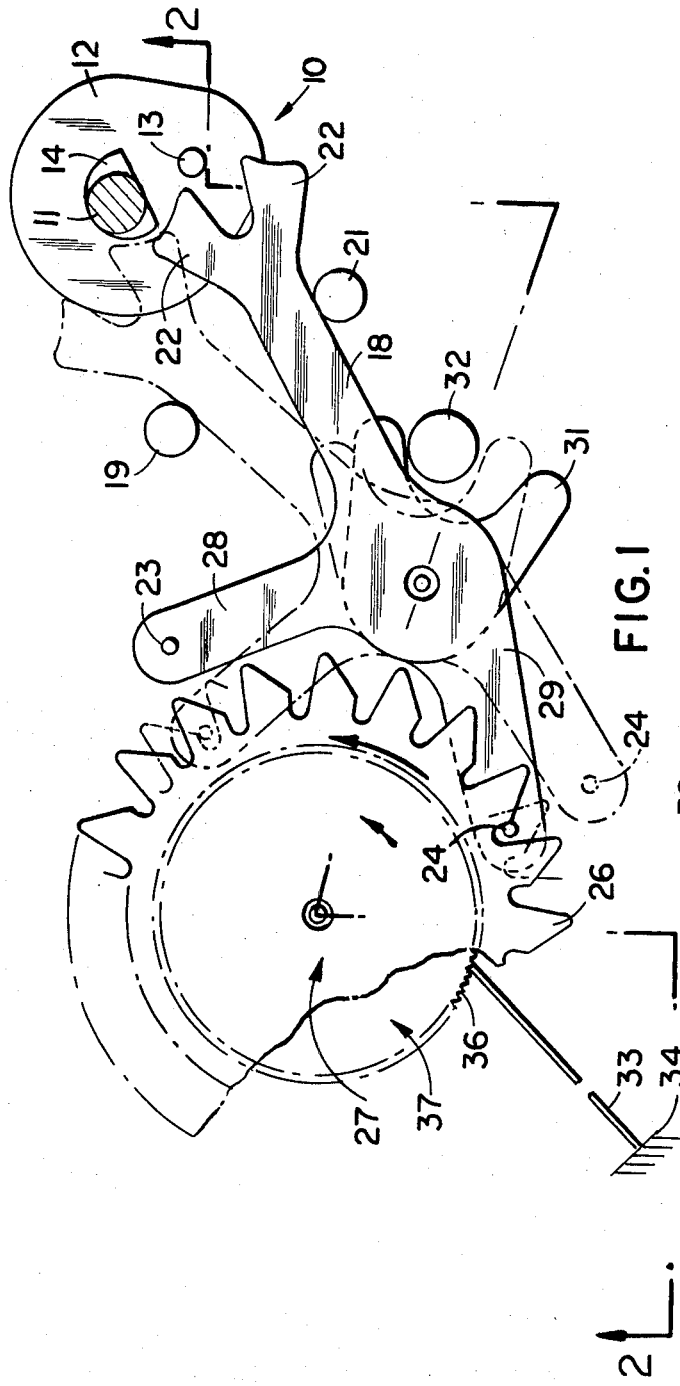
FIG. 1 is a top plan view of a schematic representation of the invention.

The driving of an indexing mechanism or dial train by the balance wheel and the transmission of the balance wheel's motion by a lever to an index wheel are known. The representation of these parts is therefore only shown schematically in the drawing. Furthermore, the impulsing of the balance wheel either electrically or electronically, and the transmission of the motion of the index wheel to the train is also known and therefore omitted from the drawing.

Figure 2:
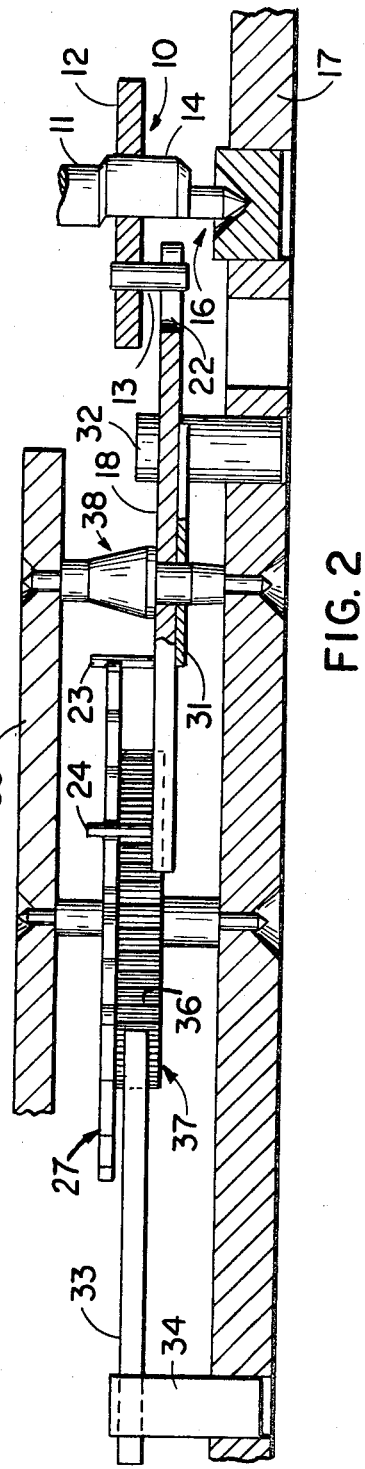
FIG. 2 is a partially cross-sectioned side view taken along the lines 2—2 of FIG. 1.

The indexing mechanism shown in FIGS. 1 and 2 comprises a balance wheel assembly 10 mounted about a balance staff 11. The balance staff 11 includes safety roller 14 and is journaled for rotation in bearing means 16 in frame 17. The balance wheel assembly 10 also includes an impulse disk 12 having an impulse pin 13 extending downwardly therefrom.

The impulse pin 13 engages the end portion 22 of index lever 18 as the impulse disk 12 oscillates back and forth under the urging of the balance wheel drive (not shown). The index lever 18 is mounted to arbor 38 which is journaled at its end portions in the front frame 17 and train bridge 39. The lever 18 oscillates between banking pins 19 and 21 as the index pins 23 and 24 alternately engage the teeth 26 of index wheel 27.

The pins 23 and 24 are mounted respectively on arms 28 and 29 of the lever 18 to effect the movement of the index wheel 27 as shown in phantom in FIG. 1. Each index pin advances the index wheel 27 by one-half pitch during each half oscillation of the lever 18.

A ferro-magnetic draw lever 31 is mounted to the index lever 18 and interacts with the indexing magnet 32. Indexing magnets are generally used not only to hold the draw lever 18 in its extreme position against banking pins 19 and 21 but also to interact with the index wheel teeth 26 to hold the index wheel 27 in position when the index pins 23 and 24 disengage from the teeth 26. In the present invention, however, the indexing magnet 32 does not act on the index wheel 27. Detenting of the index wheel 27 is accomplished by the action of a one direction drag spring 33 which is fastened to the frame post 34 at one end and engages the teeth 36 of the drag disk 37 with its free end.

The drag disk 37 is preferably of plastic material and includes on its periphery 2N times the number of teeth of the index wheel 27 (2N being the highest number of teeth practicable). This permits proper detenting of the index wheel 27 regardless of drag spring length and of tolerances due to pitch errors. The need for accurate alignment between the index wheel teeth 26 and drag disk teeth 36 is thereby eliminated. Due to the fine pitch of the drag disk teeth 36, the free end of the drag spring 33 need only point slightly past the centerline of the index wheel 27 and still will lock into the drag disk teeth 36 when reverse torque is applied to the index wheel 27.

In operation, an impulse pin 13 intermittently engages the forked end portion 22 of the index lever 18 during oscillation of the balance wheel assembly 10. The lever 18 is oscillated back and forth between banking pins 19 and 21 while the indexing magnet 32 acts on the bifurcated draw lever 31 to hold the lever 18 in its extreme positions against the banking pins 19 and 21.

The index pins 23 and 24 alternately engage the teeth 26 of index wheel 27 driving the wheel 27 in the indicated direction. Each half oscillation of the lever 18 moves the wheel 27 an amount equal to one-half the tooth pitch. Any reverse movement of the wheel is prevented by the drag disk 27 which is engaged by the free end of drag spring 33. A precise engagement is possible since the drag disk 27 includes a plurality of teeth 36 to be contacted by the spring 33.

It is to be understood that the above-described arrangements are merely illustrative examples of the application of the principles of the invention. Numerous other arrangements may be readily devised by those skilled in the art which will embody the principles of the invention and fall within the spirit and scope thereof.

What is claimed is:

1. An indexing mechanism for timepieces comprising:
   a frame,
   an oscillatory timing wheel rotatably mounted to the frame,
   means to impulse the timing wheel to provide oscillatory movement thereof,
   an index lever rotatably mounted to the frame and oscillated by the timing wheel,
   an index wheel having a plurality of teeth positioned about the periphery thereof to be engaged by the index lever and a drag disk mounted thereto, said drag disk having a large plurality of teeth relative to the index wheel positioned about the periphery thereof,
   a drag spring having one end mounted to the frame and having the other end normally engaging the teeth of the drag disk, said spring backing the teeth of the drag disk upon completion of each movement of the index wheel to prevent any reverse movement thereof,
   at least two banking pins mounted to the frame at spaced intervals on opposite sides of the index lever to limit the movement thereof,
   a draw lever connected to the index lever for movement therewith, and a magnet mounted to the frame to cooperate with the draw lever to hold the index lever in its extreme positions against the banking pins.

2. An indexing mechanism in accordance with claim 1 wherein:
the drag disk comprises a plastic member having a large plurality of teeth moulded on the periphery thereof, said disk being mounted concentrically with the index wheel, and,
the free end of the drag spring is positioned slightly to one side of a plane extending through the centerline of the index wheel and the other end of the drag spring to engage the teeth of the drag disk to prevent reverse movement thereof.

3. An indexing mechanism in accordance with claim 1 wherein:
the index lever has bifurcated end portions, one of said end portions having a pair of arms and an index pin mounted to each arm to alternately engage the index wheel teeth advancing the index wheel an amount equal to one-half the tooth pitch during each engagement.

4. An indexing mechanism in accordance with claim 3 wherein:
the draw lever comprises a substantially u-shaped member having outwardly extending arms wherein the extending arms interact with the indexing magnet.

* * * * *